Sept. 27, 1960     C. G. CRAWFORD     2,954,206
HYDRAULIC TURBINE CONTROLLER
Filed April 18, 1955     2 Sheets-Sheet 2
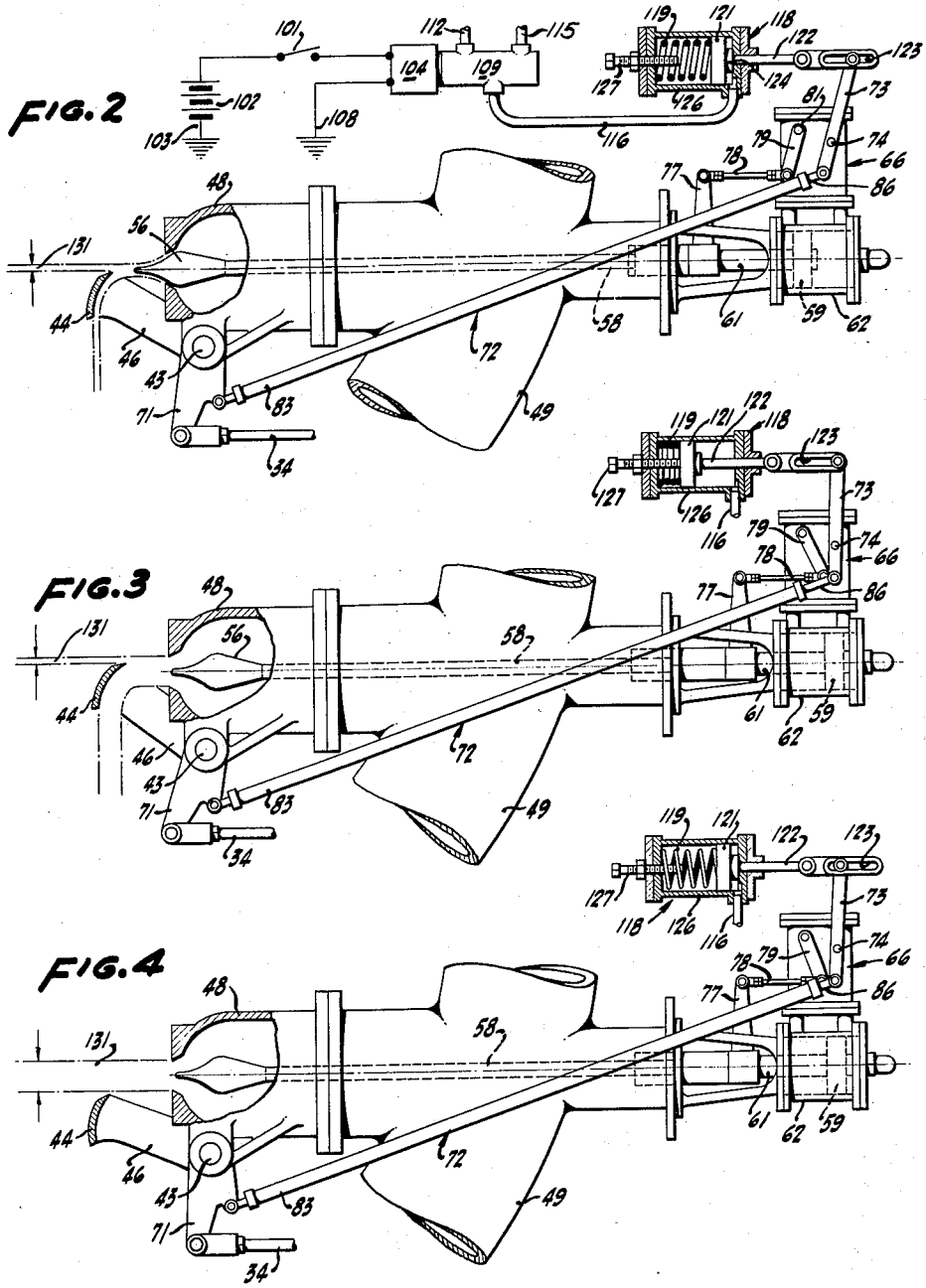
INVENTOR.
CASPAR GLENN CRAWFORD
BY
ATTORNEY United States Patent Office 2,954,206
Patented Sept. 27, 1960

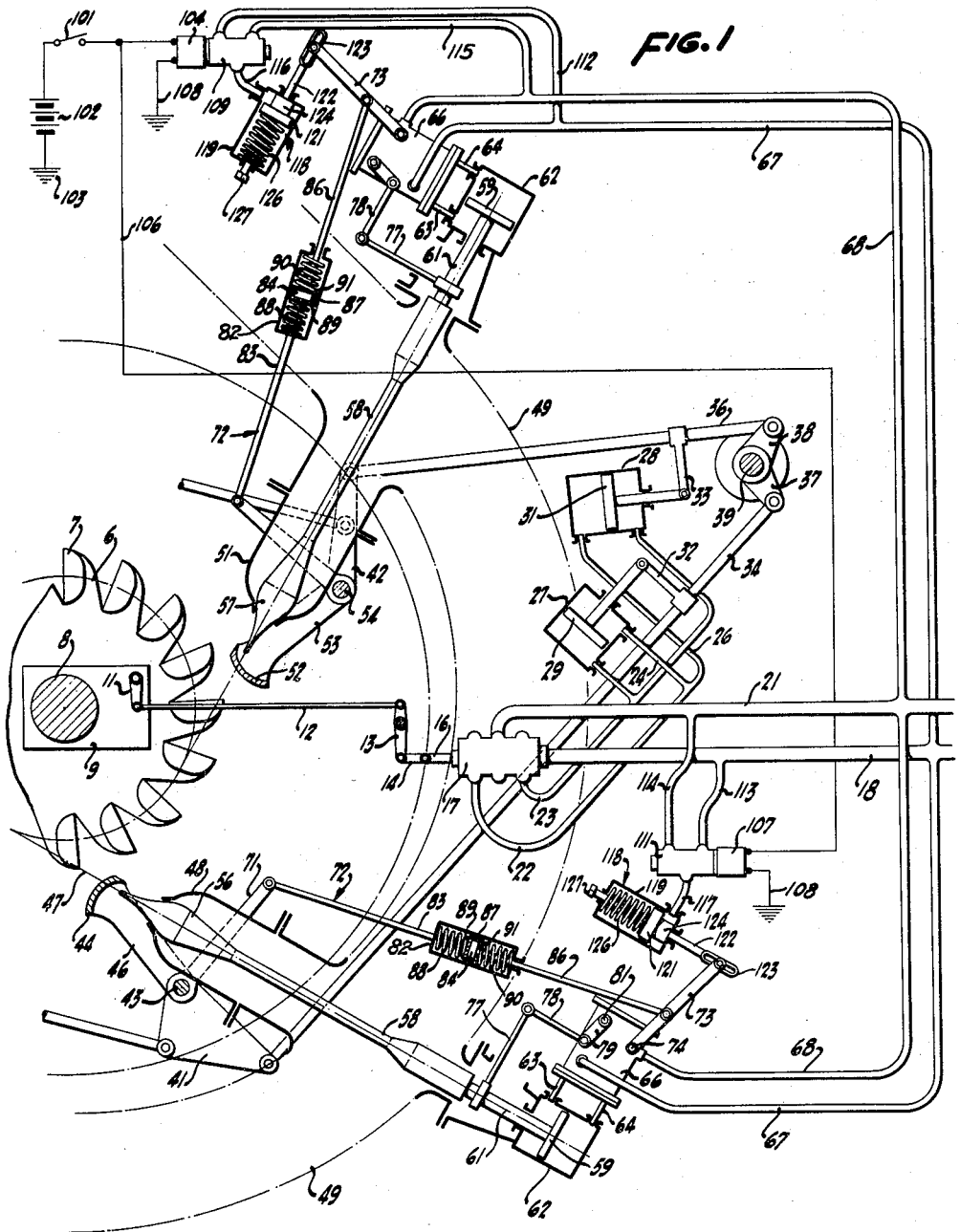

2,954,206
HYDRAULIC TURBINE CONTROLLER

Caspar Glenn Crawford, Redwood City, Calif., assignor, by mesne assignments, to Baldwin-Lima-Hamilton Corporation, Philadelphia, Pa., a corporation of Pennsylvania Filed Apr. 18, 1955, Ser. No. 501,954

3 Claims. (Cl. 253—24)

My invention relates to hydraulic turbines sometimes referred to as water wheels. Water wheels, especially of the impulse type are usually operated to drive electric generators for supplying large quantities of electricity and are motivated by water flowing to the turbine through penstocks or pipes which sometimes extend hundreds or even thousands of feet in height above the turbine inlet. It is not possible quickly to open and close the needle nozzle which controls the jet of water flowing to the turbine, for to do so might produce severe forces disruptive of the penstock. It is customary, therefore, to provide a relatively elaborate mechanism for controlling and limiting the rate of opening and of closing of the needle governing the hydraulic flow from the turbine nozzle. In some installations, particularly the more modern higher powered plants, each turbine is supplied with water jets from a plurality of nozzles, each nozzle having its own needle and controller. A representative structure of this sort is shown in Patent 2,635,847 in the name of Fred H. Rued, issued April 21, 1953, and assigned to the assignee of the present application.

In some modern installations, the electrical load imposed upon the generator driven by the turbine is very large and it is often necessary to impose the entire load upon the turbine instantaneously. This is virtually an impossibility with previously known equipment for the reason that the turbine is necessarily governed in accordance with its speed but the nozzle needles must move relatively slowly and at no more than their predetermined rates. A quick response of the governor to a sudden load increase, therefore, does not produce a quick change in the jets as controlled by the nozzle needles for a quick nozzle needle change is impossible in view of the potential destruction of the penstocks.

It is therefore an object of my invention to provide a hydraulic turbine controller affording a means for quickly imposing a heavy electrical load upon a generator driven by the turbine without the accompaniment of destructive forces on the penstocks.

Another object of my invention is to provide an improved hydraulic turbine controller.

A still further object of my invention is to provide a hydraulic turbine controller effective on the various jets of a multi-jet turbine to permit such a turbine quickly to assume a heavy load.

A still further object of my invention is to provide a hydraulic turbine controller which, while effective for the purpose, does not depart in a radical fashion from well known hydraulic turbine controlling instrumentalities.

A still further object of my invention is to provide a hydraulic turbine controller which retains all of the advantageous features of the device shown in the mentioned patent, yet which has an additional feature of quickly and safely assuming an extremely heavy load.

Other objects, together with the foregoing, are attained in the embodiment of the invention described in the accompanying description and illustrated in the accompanying drawings, in which:

Figure 1 is a diagrammatic showing of a hydraulic turbine provided with a controller according to the invention, certain parts being broken away to reduce the size of the figure and certain parts being shown schematically.

Figure 2 is a diagrammatic view of one nozzle and attendant structure of a hydraulic turbine in accordance with the invention, the controller being shown in a substantially shut down or idling position.

Figure 3 is a view comparable to Figure 2 but with the parts in position for the turbine to assume a heavy load.

Figure 4 is a view comparable to Figures 2 and 3, and showing the parts in position just after the turbine has assumed a heavy load.

In its preferred form, the hydraulic controller of the invention includes a turbine wheel 6 having a plurality of buckets 7 around its periphery. The wheel is mounted on a shaft 8 which is also the rotor shaft of the electric generator (not shown). The generator is arranged in an electric circuit required to carry a sudden, large increase in load. On the shaft 8 is a speed responsive governor 9 of any suitable sort, effective to move a lever 11 in accordance with the particular speed of the wheel 6. The lever 11 is connected by a rod 12, a lever 13 and a link 14 to the valve stem 16 of a hydraulic control valve 17. This valve receives hydraulic actuating fluid such as oil under pressure through a line 18 from any suitable pressure source (not shown). A return line 21 extends back to the pressure source. When the speed of the wheel 6 varies, the governor 9 moves the valve stem 16 in a corresponding direction. The valve 17 is thus appropriately actuated and pressure fluid is diverted into one line 22 or into another line 23 depending upon the direction of valve movement. The line 22 is provided with branches 24 and 26, the former extending to one end of a hydraulic servo cylinder 27 and the latter extending to the corresponding end of another hydraulic servo cylinder 28. Within the servo cylinders are pistons 29 and 31 connected by appropriate mechanism 32 and 33 to actuating rods 34 and 36. These rods, although not necessarily so, are preferably connected together through levers 37 and 38 fast on a common shaft 39. When the pistons 29 and 31 are moved in accordance with the pressure fluid introduced into the lines 22 or 23, the rods 34 and 36 are correspondingly moved to pivot levers 41 and 42. Since these levers are similar, the description of one applies equally to the other. The lever 41, for example, is fastened onto a pivot shaft 43 which also carries a deflector 44 at the end of shaft-mounted arms 46. The deflector 44 is a curved plate movable to and fro or into and out of the path 47 of a hydraulic jet impinging upon the buckets 7 and flowing from a nozzle 48 arranged at an appropriate point in a scroll housing 49. A similar nozzle 51 also joins the scroll housing 49 and the jet therefrom is intercepted by a deflector 52 at the end of arms 53 fastened on the shaft 54 on which the lever 42 is mounted. The two deflectors 44 and 52 operate simultaneously, each to intercept its own jet. In practice, a wheel of the sort shown usually employs four or more nozzles, two being illustrative of any number.

The flow from each of the nozzles is controlled by a contained needle, such as a needle 56 in the nozzle 48 and a needle 57 in the nozzle 51. Since all of the needles and their attendant structures are identical, a description of the needle 56 and its environs applies to the others as well. The needle 56 is at one end of a stem 58 projecting from the scroll housing 49 through suitable packing (not shown) and ending in an actuating piston 59. This piston is on a piston rod 61 entering into a servo cylinder 62. The servo cylinder is supplied with hydraulic fluid through either one of two pipes 63 and 64, from a controller 66 of the sort shown in the mentioned Rued patent and which receives pressure fluid through a line 67 and is connected with an exhaust line 68. The controller 66 is effective in response to two main factors for controlling the operation or position of the needle 56. One of the controlling factors is the influence of the governor 9. The governor produces a position of the shaft 43 corresponding to turbine speed through the action of the lever 41. An arm 71 partakes of the relative position of the deflector 44 as the other controlling factor and is connected to a rod 72 extending to a lever 73 fastened on a shaft 74 forming part of the controller 66. When the arm 71 moves, there is a corresponding motion in the lever 73 to rotate the shaft 74. This controls the influx or efflux of fluid on one side or the other of the piston 59 and produces a corresponding motion of the nozzle needle 56. However, one of the main functions of the controller 66 is to establish the maximum rate at which the nozzle needle 56 can move. This rate is established so that the nozzle needle moves relatively slowly in order that the column or stream of water in the penstock will not be accelerated positively or negatively at a dangerous rate. Correspondingly, the instantaneous position of the needle 56 is also transmitted to the controller 66, since an extension 77 fast on the shaft 61 is connected by a link 78 to an arm 79 secured on a shaft 81 in the controller 66. The result of this mechanism is to transfer or feed back the needle position to the controller 66 so that the needle, although moving at only the predetermined rate, eventually acquires a position exactly in accordance with the setting prescribed by the governor 9.

In normal operation, the position of the deflector 44 is marginally to one side of the jet issuing from the nozzle 48, the diameter of the jet being in accordance with the position of the needle 56 therein. If the needle retracts and opens the nozzle to make a larger diameter jet, the deflector 44 correspondingly retracts to a new position just outside of the enlarged jet, the deflector motion just preceding the enlargement in diameter. If the jet is reduced by the governor at a moderate rate, the deflector slowly follows the jet to a smaller diameter staying just at the jet edge. In the event the load on the water wheel 6 is suddenly removed so that the wheel tends to over-speed, it is not possible to cut down the needle nozzle 56 quickly enough. In that case the governor 9, being instantly responsive to the over-speed, instantly actuates the servos 27 and 28 so that the deflectors 44 and 52 immediately intercept the jets and remove the driving force from the wheel 6. As soon as possible thereafter, since this controlling motion is transmitted through the rod 72 to the controller 66, the needle 56 is closed, but only at the prescribed slow rate. In this fashion a sudden loss of load from the generator or from the water wheel is compensated for instantly although the penstocks are not over-stressed because the needles themselves close slowly.

The difference between the instantaneous motion of the deflectors 44 and the relatively slower motion of the nozzle needle 56, which often exists, is provided for by a yielding structure in the rod 72. This includes a casing 82 integral with the left-hand portion 83 of the rod 72 and a small piston 84 integral with the right-hand portion 86 of the rod 72. These portions 83 and 86 of the rod may move independently of each other along the same axis. Within the casing 82 there is an annular abutment 87 coextensive with the piston 84 in the mid-position thereof. Within the casing are opposite coil springs 88 and 90 bearing upon the casing at one end and also bearing upon washers 89 and 91 at the other end. Since the springs are installed under stress, the rod 72 for all normal loads is substantially a solid body. If an abnormal load is put upon the rod in either direction the piston 84 compresses the corresponding spring 87 or 88 and the rod portion 86 then moves relatively to the rod portion 83. In this fashion the deflector 44 can move quickly in response to the governor, whereas the nozzle 56 can move slowly in response to the controller.

In accordance with the invention, I provide an additional controlling instrumentality which permits the very abrupt imposition of a large load upon the water wheel 6. In a representative example, the electrical load in an aluminum plant is to be imposed upon the electrical line running to the power house in which the generator driven by the turbine 6 is located. Just before the load is to be added, that information is telephoned to the power house operator. Thereupon, the power house operator closes an electric switch 101 in a local electric circuit diagramatically shown as including a source of electricity 102 grounded at 103. A conductor from the switch 101 leads to an electro-magnetic actuator 104 and another conductor 106 leads to a similar electro-magnetic actuator 107. The two actuators are provided with grounds 108 and are operated simultaneously. Each of the actuators is provided with one of a pair of hydraulic valves 109 and 111, in turn connected by conduits 112 and 113 to the source of pressure fluid and connected by conduits 114 and 115 to the low pressure fluid lines. The valves 109 and 111 are connected by ducts 116 and 117 to the respective one of a pair of hydraulic actuators 118. Since these actuators are identical, the description of one applies also to the other. Each actuator includes a housing 119 in the form of a cylinder within which a piston 121 is reciprocable. The piston is mounted on a piston rod 122 engaged through a lost motion link 123 to the lever 73 on the controller 66. The piston 121 is urged against a stop 124 by means of a spring 126 having an adjusting screw 127 for regulating the pressure exerted thereby. When no hydraulic pressure is exerted upon the interior of the cylinder 118, the spring 126 keeps the piston 121 against the stop 124 and the lever 73 operates normally in the lost motion link 123 without interference. When the switch 101 is closed and the actuators 104 and 107 are energized, then the valves 109 and 111 are shifted so that pressure fluid is conducted to the interior of the cylinders 119 and the pistons 121 are moved against the urgency of the springs 126, the amount of such movement being set by the adjusting screw 127 which acts as a limit stop rather than by the resistance of the springs 126. When the limit stop arrests the motion of the piston 121, it also arrests the lost motion link 123. In the meantime, however, the lost motion is taken up in the link connection with the lever 73 which is moved to adjust the controller 66. This motion of the lever 73 can take place despite the lack of a corresponding motion of the deflector 44 because of the interposition of the yielding structure in the rod 72. Motion of the lever 73 affects the controller 66 in such a way as to introduce hydraulic pressure fluid through the conduit 63 into the cylinder 62 and to provide a corresponding movement of the piston 59 in an opening direction. When the nozzle has been opened a corresponding or predetermined amount that movement is transmitted through the lever 79 to the controller 66 and hence the needle 56 is moved into an open position. The amount of needle opening movement is preset by the position of the stops 127 so that when the operator closes the switch 101 the first effect is to give an opening movement to the various needles 56 and 57 in a predetermined, selected amount and despite any other controlling conditions imposed upon the system through the governor. The position of the parts before the closure of the switch 101 is as shown in Figure 2 and the position of the parts after the closing of the switch 101 is as shown in Figure 3, wherein the nozzles have been opened a predetermined amount or have assumed an intermediate position between fully closed position and fully open position. Since the amount of water issuing from the part way open nozzles is far in excess of the amount required to drive the water wheel 6 under the then existing relatively light load, the governor prevents over-speeding of the wheel by interposing the deflectors 44 and 52 in the path of most of the jet. The remaining jet 131, as shown in Figures 2 and 3, is of substantially the same, proper size despite the fact that the nozzle in one position is nearly closed and in the other position is substantially in an intermediate open position. This intermediate position is selected as one which will be approximately correct for the expected increase in load.

While the operator maintains the switch 101 closed and thus insures that the nozzles are pre-opened a selected amount to meet the expected load, the load is imposed by the consumer. The added load immediately causes a reduction in speed of the water wheel 6. This is immediately effective upon the governor structure 9 and produces a prompt withdrawal of the deflectors 46 and 52 from the path of the jet stream, as shown in Figure 4. Since the jet deflectors can move out of the jet paths very quickly, the full impact of the pre-selected stream jet is then quickly made effective upon the water wheel 6 and the speed lost due to the sudden imposition of the load is well within permissible limits. As soon as the deflectors 52 and 44 have been withdrawn to one side of the jet stream, as shown in Figure 4, the operator opens the switch 101. That de-energizes the coils 104 and 107 shifting the valves 109 and 111 and permitting the springs 126 to restore the pistons 121 to their positions against the stops 124 and expelling the hydraulic fluid through the lines 116 and 117 in the process. The lost motion link 123 is then in a position in which the regulator 66 is free to operate in its normal fashion to adjust the size of the jet by slow changes in the position of the needles 56 and 57 or if there should be abrupt over-speeding by quickly interposing the deflectors 44 and 52 in the jet paths.

In accordance with this structure, therefore, it is possible to provide automatic regulation of the nozzle needles and of the deflectors in a hydraulic turbine and to precondition the turbine for the reception of a suddenly imposed large load. This is done by opening the nozzle needles relatively slowly but to a predetermined intermediate position before the load is imposed, during which time the governing of the turbine is carried on by the deflectors operated directly by the speed governor structure. Just before the suddenly increased load is imposed, the power house operator by an electro-hydraulic control opens the nozzle needles to a predetermined extent calculated substantially to carry the increase in load. When the load is imposed, the governor structure automatically removes the deflectors from the increased sized jets so that the added load is properly carried by the water wheel. As soon as the load has been assumed, the operator de-energizes the electro-hydraulic mechanism to restore the automatic control of the turbine to the usual regulating devices.

What is claimed is:

1. A hydraulic turbine controller comprising a turbine wheel, a turbine nozzle disposed to direct a hydraulic jet toward said wheel, a deflector disposed to move out of and into a position intercepting said jet, a governor responsive to the speed of said wheel, means responsive to said governor for so moving said deflector, a needle movable between open and closed positions through an intermediate position for controlling hydraulic flow through said nozzle, means responsive to said governor for positioning said needle at a predetermined slow rate, and means superseding said governor responsive means for positioning said needle in said intermediate position.

2. A hydraulic turbine controller comprising a turbine wheel, a turbine nozzle disposed to direct a hydraulic jet toward said wheel, a deflector disposed to move out of and into a position intercepting said jet, a governor responsive to the speed of said wheel, means responsive to said governor for so moving said deflector, a needle movable between open and closed positions for controlling hydraulic flow through said nozzle, means responsive to said deflector position for positioning said needle at a predetermined rate, and means independent of the position of said deflector for preventing movement of said needle from an intermediate position toward closed position.

3. A hydraulic turbine controller comprising a turbine wheel, a turbine nozzle disposed to direct a hydraulic jet toward said wheel, a deflector disposed to move out of and into a position intercepting said jet, a governor responsive to the speed of said wheel, means responsive to said governor for so moving said deflector, a needle movable between open and closed positions for controlling hydraulic flow through said nozzle, means including a yielding connection and responsive to said deflector position for positioning said needle at a predetermined rate, and hydraulic means controllable by an operator for selectively preventing movement of said needle from a predetermined intermediate position toward closed position.

References Cited in the file of this patent

UNITED STATES PATENTS

| | | |
|---|---|---|
| 1,035,082 | Cachin | Aug. 6, 1912 |
| 1,685,749 | Pfau | Sept. 25, 1928 |
| 1,685,750 | Pfau | Sept. 25, 1928 |
| 1,706,812 | Pfau | Mar. 26, 1929 |
| 2,291,453 | Deglon | July 28, 1942 |
| 2,365,905 | Rheingans | Dec. 26, 1944 |
| 2,635,847 | Rued | Apr. 21, 1953 |